United States Patent
Isakson

(10) Patent No.: US 8,468,932 B2
(45) Date of Patent: Jun. 25, 2013

(54) SELF-RETAINING END CAP FOR BRAKING BOOSTER

(75) Inventor: Larry E. Isakson, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 688 days.

(21) Appl. No.: 12/699,363

(22) Filed: Feb. 3, 2010

(65) Prior Publication Data

US 2011/0185887 A1 Aug. 4, 2011

(51) Int. Cl.
*F01B 31/28* (2006.01)

(52) U.S. Cl.
USPC .......................................... 92/128; 92/130 R

(58) Field of Classification Search
USPC ................. 92/128, 130 R, 135, 169.1, 170.1, 92/171.1
See application file for complete search history.

(56) References Cited

U.S. PATENT DOCUMENTS

| | | | |
|---|---|---|---|
| 4,532,856 A * | 8/1985 | Taylor | 92/170.1 |
| 4,867,043 A * | 9/1989 | Antkowiak | 92/170.1 |
| 5,136,927 A | 8/1992 | Rossigno et al. | |
| 5,368,139 A | 11/1994 | Pirrallo et al. | |
| 5,669,284 A * | 9/1997 | Fish | 92/128 |
| 6,003,426 A | 12/1999 | Kobayashi et al. | |
| 6,295,916 B1 | 10/2001 | Horner | |
| 6,302,011 B1 | 10/2001 | Horner | |
| 6,955,044 B1 | 10/2005 | Doty | |

* cited by examiner

*Primary Examiner* — Michael Leslie

(74) *Attorney, Agent, or Firm* — Maginot, Moore & Boek

(57) ABSTRACT

A brake booster includes a housing configured for mounting to the master cylinder of a braking system. The housing defines a bore for receiving a power piston and an end cap, with a return spring disposed between the head of the piston and end cap. The housing and end cap define a recess and a rib sized to be received within the rib but configured for an interference fit between the end cap and housing outside the recess. The interference fit is calibrated to require a force to push the end cap into the bore that exceeds the force generated by the return spring when it is compressed between the end cap and the piston head. The recess and rib at least temporarily retains the spring within the bore until the brake booster is mounted to the master cylinder.

17 Claims, 3 Drawing Sheets

SELF-RETAINING END CAP FOR BRAKING BOOSTER

BACKGROUND

The present disclosure relates to hydraulic braking systems and more particularly to a brake booster used with a braking master cylinder.

Generally, hydraulic braking systems include an element, such as a drum, associated with a vehicle wheel, brake shoes, a backing plate, and a hydraulic cylinder. The drum includes a braking surface against which the brake shoes bear when the braking system is activated. The backing plate does not rotate with the wheel or drum, but instead supports the hydraulic cylinder, the brake shoes, and the other braking components.

The hydraulic cylinder, or master cylinder, incorporates one or more pistons which force the brake shoes against the braking surface of the drum to stop or to limit the rotation of the drum. To activate the braking system an actuator, such as a foot pedal, is moved, thereby causing an increased hydraulic pressure in the master hydraulic cylinder. This increased pressure forces the piston(s) to extend from the master cylinder to drive the brake shoes.

In certain heavier vehicles, the hydraulic braking system may include a booster that is coupled to the master cylinder to magnify the hydraulic pressure applied to the brake shoes. A typical booster scavenges pressure from a source outside the braking system, such as from the power steering hydraulics of the vehicle, and uses that hydraulic pressure to drive a power piston within the booster. The power piston applies a force to the master cylinder piston(s) to thereby increase the braking force available through the braking system.

By way of example, FIG. 1 depicts a brake booster 10 coupled to a master cylinder 12 of a hydraulic braking system. The booster housing 11 is mounted to the housing 13 of the master cylinder with the power piston 16 of the booster slidably disposed within a bore 11a and axially aligned with the primary piston 18 of the master cylinder. The booster 10 includes a throttle 19 connected to the braking actuator, such as the foot pedal, that is operable to activate the power piston 16. The booster 10 includes a return spring 24 that is operable to return the power piston 16 to the neutral position shown in FIG. 1 when the braking actuator has been released. One end of the spring 24 bears against the head 16a of the piston disposed at one end, or piston end, of the bore 11a. The opposite end of the return spring must bear against a reaction surface, which includes the master cylinder housing 13 when the booster 10 is coupled to the master cylinder 12 at the opposite end, or mating end 11b, of the bore 11a.

However, prior to mounting the booster 10 it is necessary to retain the return spring 24 within inner bore 11a of the booster housing as the booster 10 is being assembled. Consequently, an end cap 20 has been included in prior booster devices that provides the reaction surface to retain the spring. The end cap 20 is supported on the power piston 16 at the mating end 11b of the bore 11a, as shown in the enlarged view of FIG. 2. The end cap 20 includes an inner hub 21 that may be sized for a close running fit with the outer surface of the piston. Alternatively, a seal 22 may be engaged over the inner hub 21 to provide a tight fit between the hub and the piston; however, the tight fit provided by the seal 22 is not sufficient to resist the force of the return spring 24. Consequently, a retaining ring 25 is provided that is retained in a circumferential groove 26 formed near the end of the power piston. The retaining ring 25 extends radially outward to contact a mating face 23 of the end cap 20. The retaining ring may be in the form of a snap ring or a lock washer that snaps into the groove 26 in the power piston.

The retaining ring 25, mounted to the end of the power piston 16, thus traps the return spring 24 within the inner bore 11a of the brake booster 10. One end of the spring bears against the head 16a of the piston while the other end bears against the end cap 20 held by the retaining ring 25. However, as shown in the detail view of FIG. 2, when the brake booster 10 is mounted to the master cylinder 12, the inner mating surface 14 of the master cylinder housing 13 provides the reaction surface against which the end cap 20 bears under the force of the return spring 24. The housings 11 and 13 are typically toleranced so that when the housings are coupled together the mating face 14 of the master cylinder housing 13 essentially pushes the end cap 20 away from the retainer ring 25. In other words, when the booster is assembled with the master cylinder the retainer ring 25 becomes superfluous since it can no longer contact the end cap 20.

In this prior brake booster, the interface between the end cap 20 and the booster housing 11 is configured to facilitate insertion of the end cap into the inner bore 11a. Thus, as shown in the detailed view of FIG. 3, the end cap includes an outer circumferential rim 30 that is sized for a close running fit with the inner bore 11a. In certain boosters, a seal 34 may be engaged over the outer rim 30 to provide a tight fit between the rim and the housing. As with the seal 22 described above, the tight fit provided by the seal 34 is not sufficient to resist the force of the return spring 24. The end cap 20 includes a spring retainer surface 32 that provides the reaction surface for the spring 22 and helps retain the spring in axial alignment with the power piston 16.

Also shown in FIG. 3 is the relationship between the master cylinder housing 13 and the end cap 20. In particular, the outer mating surface 15 of the master cylinder housing 13 contacts the booster housing 11. The inner mating surface 14 is offset in relation to the outer mating surface 15 to account for the offset of the end cap mating face 23 relative to the end of the outer rim 30. The tolerance stack between the master cylinder housing mating surfaces 14 and 15 and the booster housing 11 is such that the master cylinder housing 13 slightly compresses the end cap 20 against the return spring 24 when the two housings are coupled. This arrangement renders the retaining ring 25 no longer necessary, as explained above.

SUMMARY

A braking booster is provided including a housing configured to be coupled to the housing of a master cylinder. The housing defines a bore for receiving a power piston with the piston head disposed at one end of the bore. An end cap is slidably disposed within and at an opposite mating end of the bore, and is used to trap a return spring between the piston head and the end cap. In one feature, the end cap and the housing define a recess and a rib adjacent the mating end of the bore. The rib is configured to be received within the recess and is further configured for an interference fit between the end cap and the housing outside the recess, and more particularly between the recess and the mating end of the bore. The recess and rib at least temporarily hold the end cap within the bore to thereby retain the return spring within the bore until the braking booster is mounted to the master cylinder.

In one aspect, the recess is defined adjacent the mating end of the bore of the housing and the rib is defined on the end cap. For a cylindrical bore in the booster housing, the recess is a circumferential recess within the bore and the rib is a circumferential rib. The end cap may include a circumferential rim sized for a close running fit with the bore, the rib extending radially outward from the rim. In order to facilitate introduction of the end cap into the bore and ultimately into the recess, the housing may define a circumferential chamfer at the mating end of the bore, the chamfer terminating adjacent the recess.

In the brake booster, the return spring has an initial state in which the spring is compressed between the end cap and the piston head to generate an initial spring force and an operative state in which the spring is further compressed to generate an operative spring force greater than the initial spring force. In one feature, the interference fit is calibrated to require a predetermined force greater than the initial spring force to push the end cap into the mating end of the bore until the rib is received within the recess. This predetermined force is sufficient to hold the end cap within the bore, trapping the return spring even under the initial spring force, at least until the braking booster is mounted to the master cylinder.

The recess may include an end face closest to the mating end of the bore, in which the rib and the end face are configured to resist expulsion of the rib toward the mating end of the bore by operation of the return spring. The rib and the end face may be configured to require a predetermined force greater than the operative spring force to expel the end cap from the recess toward the mating end of the bore.

In another feature, the end cap includes a circumferential rim and a resiliently compressible seal mounted on the rim. The compressible seal is configured to form at least a close running fit with the bore. The rib to be disposed within the recess is formed by an enlarged portion of the seal.

A method for assembling a brake booster including a housing defining a bore, a power piston having a piston head, an end cap, and a return spring disposed between the piston head and the end cap, comprises providing the housing with a circumferential recess defined in the bore adjacent a mating end of the bore, and providing a circumferential rib on the end cap, the rib sized to be received within the recess and for an interference fit with the bore between the mating end and the recess. The method further includes introducing from the mating end of the bore the power piston into the bore with the piston head disposed at the opposite end of the bore, and then introducing from the mating end of the bore the return spring over the piston and in contact with the piston head. The end cap is then introduced into the bore from the mating end of the bore. The end cap is pressed through the interference fit until the rib is disposed within the recess.

DETAILED DESCRIPTION

Figure 1:
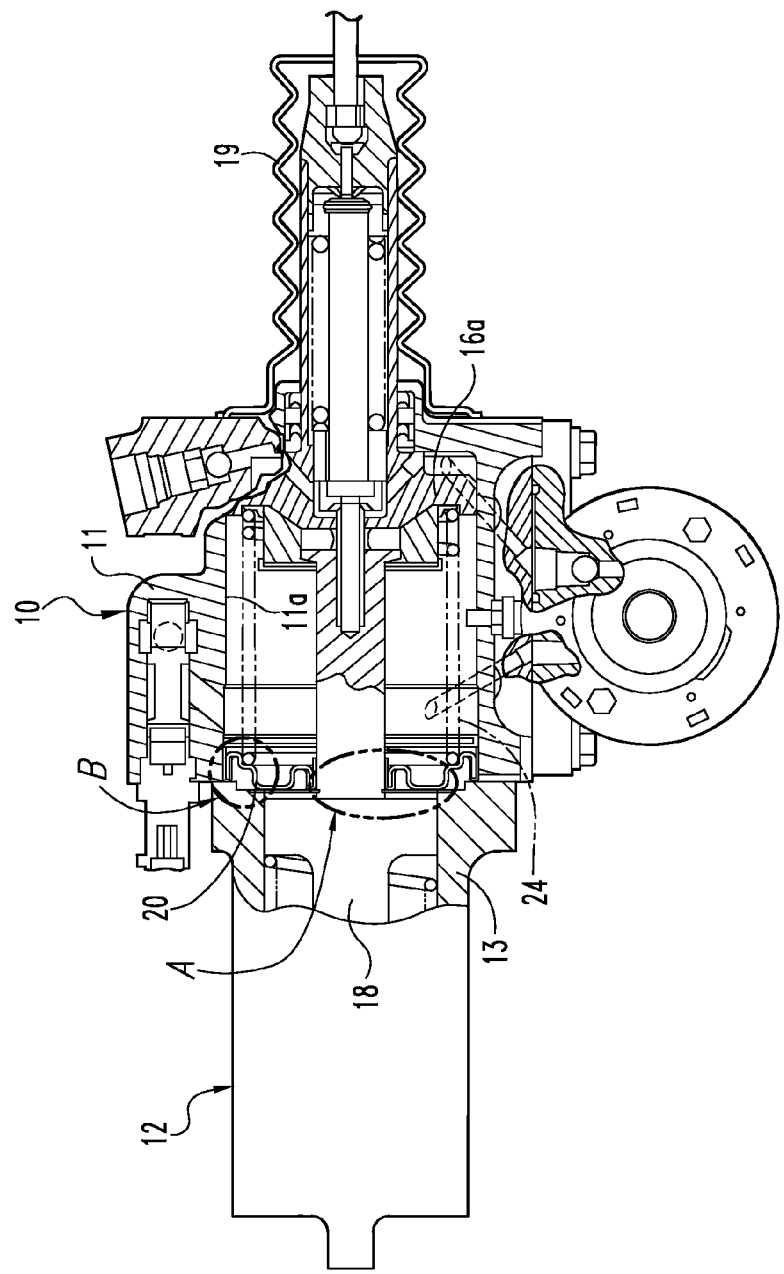
FIG. 1 is a schematic view of a brake booster coupled to a master cylinder in a hydraulic braking system.
Figure 2:
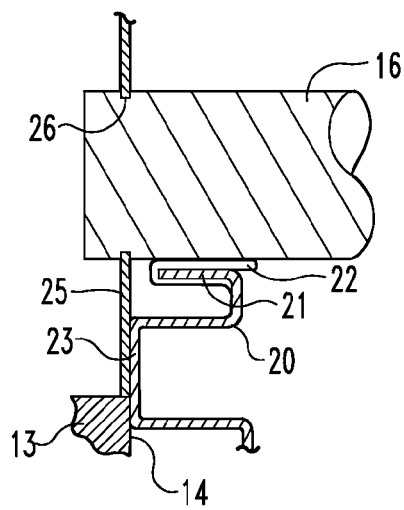
FIG. 2 is an enlarged cross-sectional view of the area A in FIG. 1.
Figure 3:
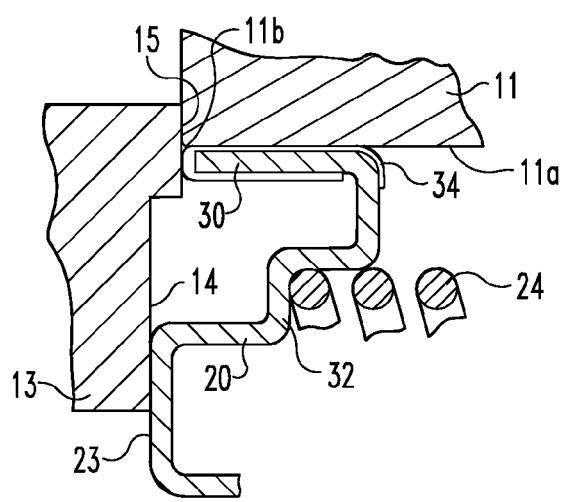
FIG. 3 is an enlarged cross-sectional view of the area B in FIG. 1.
Figure 4:
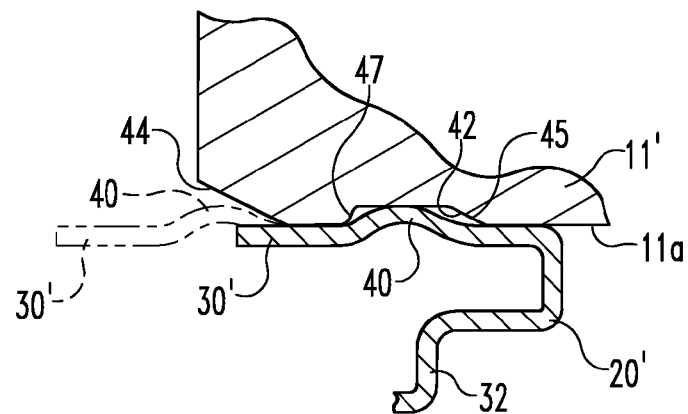
FIG. 4 is an enlarged view of a modified booster housing and end cap according to the present disclosure.

In accordance with the present disclosure, the retaining ring 25 is eliminated in favor of a modified interface between the end cap and the booster housing. Thus, as shown in FIG. 4, the modified end cap 20' includes an outwardly projecting circumferential rib 40 defined in the outer rim 30'. The remainder of the end cap 20' may be configured like the end cap 20 shown in FIGS. 1-3.

The booster housing 11' is modified to incorporate a circumferential recess 42 adjacent the mating end 11b of the bore 11a. The recess 42 is sized to receive the rib 40' of the end cap 20'. Except for the rib 40, the outer rim 30' is sized for a close running fit within the inner bore 11a of the housing 11'. The rib, on the other hand, is sized for an interference fit with the bore 11a, except at the recess 42. In the position shown in FIG. 4, the rib 40 is engaged within the recess 42 and resists expulsion even under the force of the return spring against the end cap 20'.

In order to facilitate assembly of the end cap, the housing 11' is provided with a circumferential chamfer 44 at the mating end 11b of the bore. The chamfer may be offset from the recess 42, as depicted in FIG. 4. The end cap 30' is shown in FIG. 4 in phantom lines entering the inner bore 11a. As the end cap approaches the housing 11', the circumferential rib 40 bears against the chamfer 44 and follows this angled surface into the bore 11a. The chamfer 44 may be at an angle of less than about 25°. As the rib rides the chamfer, the outer rim 30' is uniformly radially compressed. When the end cap has been advanced far enough into the bore, the rib encounters the recess 42 so that the outer rim 30' can return to its original shape and radius. The rib 40 may be generally circular in cross-section, as shown in FIG. 4 to reduce the friction between the rib and the housing as the end cap is pushed into place.

The maximum radial dimension of the circumferential rib 40 is sized relative to the radius of the inner bore 11a to provide an interference fit to produce a calibrated force necessary to push the end cap into the position shown in FIG. 4. In particular, this "push-in" force must be greater than the force generated by the return spring in its initial or installed state. It is understood that in most brake boosters the return spring will be slightly compressed so that the spring will generate a return force throughout its entire stroke. In one specific example, the return spring in its installed state generates a spring force of under 17 lbs. Thus, the "push-in" force for the end cap must exceed that spring force. In a specific example, the circumferential rib diameter was sized to produce a nominal interference fit of 0.015 in. which led to a "push-in" force of about 20 lbs. that exceeds the installed state spring force.

The recess 42 may be provided with a distal face 45 farthest from the mating end 11b of the bore 11a that is generally parallel to the chamfer 44, or more specifically at an angle of less than about 25°. The relationship between the rib 40 and the distal face 45 is such that the rib 40 may be dislodged inwardly from the recess 42 if the end cap 20' is pushed deeper into the inner bore 11a. However, once the "push-in" force is removed, the return spring 24 will push the end cap outward until the rib re-engages within the recess 42.

In one configuration, the maximum radius of the rib 40 is equal to the maximum radius of the recess 42 so that the outer rim 30' is not deformed when the rib is within the recess. Thus, the recess may have a depth equal to the height or prominence of the rib relative to the outer diameter of the outer rim, which corresponds to the nominal interference fit, or about 0.015 in. in the example discussed above. Since the return spring 24 will necessarily be compressed during actuation of the power piston 16, it may be desirable for the interface between the circumferential rib 40 and the recess 42 to hold the end cap 20' in place within the recess when subjected to a greater force than the installed state spring force. For instance, in a specific example, the operationally compressed return spring 24 may generate a force of about 35 lbs. when the throttle 19 is actuated. This value exceeds the 20 lb. "push-in" force as facilitated by the chamfer 44 in the housing 11'. However, unlike the entry to the recess, the exit from the recess is not chamfered. In particular, the end face 47 of the recess 42 closest to the mating end 11b of the bore 11a is substantially perpendicular to the surface of the bore. Thus, rather than sliding along a chamfered surface, the rib 40 must "climb" the end face 47 to be dislodged from the recess. In the specific example described above, the depth of the recess and the height of the rib require a force of over 50 lbs before the rib exits the recess. This force exceeds the spring force of 35 lbs for the operational state of the return spring 24. Thus, the end face 47 is sufficient to hold the rib within the recess, and consequently the return spring within the booster housing 11' under all conditions.

It can be appreciated that the relative dimensions of the rib 40 and recess 42 are dictated by the spring force that the rib-recess engagement must resist. For instance, if the installed spring force is greater the interference dimension between rib and recess may be increased. In addition, the general circular configuration of the rib 40 may be modified particularly to increase the maximum spring force that can be sustained before the rib is dislodged from the recess. For example, the trailing face of the rib 40 that faces the end face 47 when the rib is in the recess can be modified to present a sharper profile, rather than the generally circular profile shown in FIG. 4. Manufacturing considerations notwithstanding, a generally perpendicular trailing face of the rib abutting the generally perpendicular of the recess could almost permanently capture the end cap. However, it may be more beneficial to configure the rib and recess to permit removal of the end cap when needed for servicing the brake booster 10.

It can be appreciated that the circumferential rib and recess interface between the end cap and the booster housing is sufficient to hold the booster assembly together prior to coupling the booster to the master cylinder. Once the master cylinder is added the mating surface 14 provides the reaction surface for the return spring, by way of the end cap, and the rib 40 and recess 42 become superfluous, just like the retainer ring 25. However, the rib and recess components of the modified booster 11' eliminates the more complicated machining operation to form the snap ring groove in the power piston, in favor of the more easily machined chamfer 44 and recess 42. Moreover, eliminating the retainer ring removes a labor-intensive step in the assembly of the brake booster of engaging the retainer ring within the snap ring groove while holding the end cap against the force of the return spring.

With respect to the end cap, if the end cap is molded or forged production of the modified end cap 20' is no more involved than production of the end cap 20 used in the prior booster designs. The modified end cap 20' does not require the seal 22 of the prior end cap design. The modified end cap leads to a reduction in manufacturing and assembly costs and assembly time.

Figure 5:
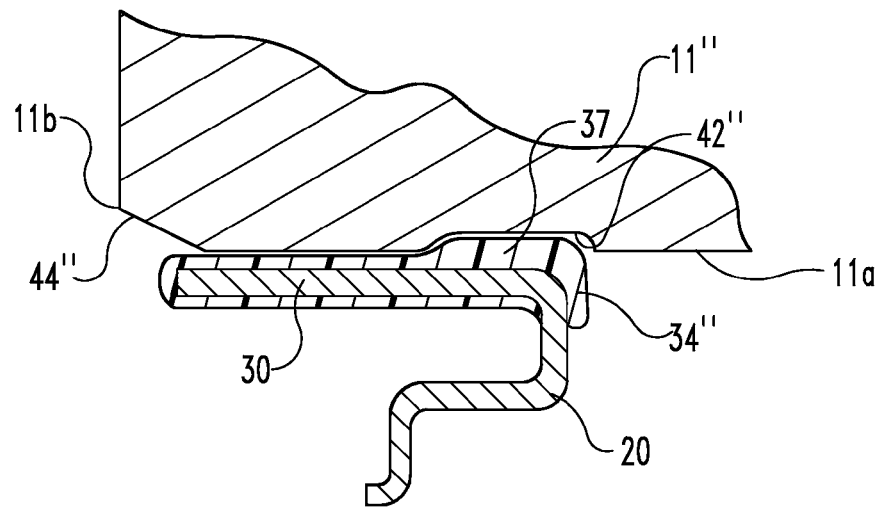
FIG. 5 is an enlarged view of another modified booster housing and end cap according to the present disclosure.

In an alternative configuration shown in FIG. 5, a booster housing 11" includes a recess 42" that is modified from the recess shown in FIG. 4. The end cap 20 is configured substantially like the end cap in the prior brake booster designs. However, in this alternative configuration, a modified seal 34" is engaged about the outer rim 30 in frictional contact with the inner bore 11a of the housing 11". The modified seal 34" includes an enlarged portion 37 that is resiliently compressible when pushed into the inner bore 11a. A chamfer 44" may be added to facilitate compressing the seal as it squeezes between the outer rim 30 and the inner bore 11a. With sufficient radial pressure, the outer rim 30 may also deform. Once the enlarged portion 37 of the seal 34" reaches the recess 42" the seal resiliently expands to fill the recess.

Like the rib-recess interface of FIG. 4, the enlarged seal and recess interface is sized to require a "push-in" force that exceeds the installed spring force of the return spring 16. In this embodiment, the enlarged seal portion 37 may not need to be sized to prevent dislodgement under operating spring loads, since the master cylinder housing 13 will be available to provide a reaction surface for the return spring.

In the configuration shown in FIG. 4, the male component of the rib-recess interface (i.e., the rib 40) is part of the end cap 30', while the female component (i.e., the recess 42) is part of the booster housing 11'. In an alternative configuration, the male and female components may be reversed. In this configuration, the rib is a radially inwardly projecting circumferential rib formed on the inner bore 11a. The recess, then, is defined in the outer rim 30' of the end cap 20'. The interference fit relationship between the rib and recess described above may be maintained to provide the same "push-in" force and the same resistance to the operationally loaded return spring.

It will be appreciated that various of the above-described features and functions, as well as other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A braking booster comprising:
   a housing defining a bore having a surface;
   a power piston having a piston head slidably disposed within and at one end of said bore;
   an end cap slidably disposed within and at an opposite mating end of said bore, said end cap including a spring contact portion and an outer rim extending along said bore of said housing, said outer rim including one of a recess and a rib disposed between a first generally planar portion and a second generally planar portion, wherein the first and second generally planar portions are configured to contact said surface of said bore; and
   a return spring disposed between said piston head and said end cap in contact with said spring contact portion,
   wherein said housing defines the other of said recess and said rib adjacent said mating end of said bore, said rib configured to be received within said recess and further configured for an interference fit between said end cap and said housing outside said recess, said interference fit being configured such that one of said first and second generally planar portions being displaced further away from said surface of said bore than the other of said first and second generally planar portions.

2. The braking booster of claim 1, wherein:
   said recess is defined adjacent said mating end of said bore of said housing;
   said rib is defined on said end cap; and
   said rib and said housing are configured for said interference fit at least between said recess and said mating end of said bore.

3. The braking booster of claim 2, wherein:
   said bore is a cylindrical bore;
   said recess is a circumferential recess within said bore; and
   said rib is a circumferential rib.

4. The braking booster of claim 3, wherein said outer rim includes a circumferential outer rim sized for a close running fit with said bore, said rib extending radially outward from said circumferential outer rim.

5. The braking booster of claim 3, wherein said housing defines a circumferential chamfer at said mating end of said bore, said chamfer terminating adjacent said recess, wherein said first generally planar portion is configured to extend from said rib and to define a space between said circumferential chamfer and said first generally planar portion.

6. The braking booster of claim 3, wherein said recess includes an end face closest to said mating end of said bore, said rib and said end face configured to resist expulsion of said rib toward said mating end of said bore by operation of said return spring.

7. The braking booster of claim 6 wherein said recess further includes a distal face displaced further from said mating end of said bore when compared to said end face, and an intermediate portion between said distal face and said end face, wherein said rib is configured to be captured between said end face and said distal face when disposed in said recess.

8. The braking booster of claim 7 wherein the distal face is generally parallel to the chamfer.

9. The braking booster of claim 7 wherein the distal face is defines an angle with the surface of the bore of generally less than twenty-five degrees.

10. The braking booster of claim 7 wherein the intermediate portion defines a line generally parallel with a line of the surface of the bore where a plane intersects both the intermediate portion and the surface of the bore.

11. The braking booster of claim 6, wherein:
said return spring has an initial state in which said spring is compressed between said end cap and said piston head to generate an initial spring force and an operative state in which said spring is further compressed to generate an operative spring force greater than said initial spring force; and
said rib and said end face are configured to require a predetermined force greater than said operative spring force to expel said end cap from said recess toward said mating end of said bore.

12. The braking booster of claim 6, wherein said end face is substantially perpendicular to the surface of said bore.

13. The braking booster of claim 3, wherein:
said end cap further includes a resiliently compressible seal mounted on said outer rim forming at least a close running fit with said bore; and
said rib is formed by an enlarged portion of said seal.

14. The braking booster of claim 1, wherein said recess has a depth and said rib has a height substantially equal to said depth.

15. The braking booster of claim 1, wherein:
said return spring has an initial state in which said spring is compressed by and is in contact with said spring contact portion of said end cap and said piston head to generate an initial spring force; and
said interference fit is calibrated to require a predetermined force greater than said initial spring force to push said end cap into said mating end of said bore until the rib is received within said recess.

16. A method for assembling a brake booster including a housing defining a bore, a power piston having a piston head, an end cap, and a return spring disposed between said piston head and said end cap, comprising:
providing the housing with a circumferential recess defined in the bore adjacent a mating end of the bore;
providing a circumferential rib on the end cap, the rib sized to be received within the recess and for an interference fit with the bore between the mating end and the recess;
introducing from the mating end of the bore the power piston into the bore with the piston head disposed at the opposite end of the bore;
introducing from the mating end of the bore the return spring over the piston and in contact with the piston head; and
introducing the end cap into the bore from the mating end of the bore and pressing the end cap through the interference fit until the rib is disposed within the recess and the spring is compressed to generate an initial spring force.

17. The method of claim 16 wherein the step of providing the housing with a circumferential recess defined in the bore adjacent a mating end of the bore includes locating the circumferential recess at a predetermined location such that a master cylinder housing mounted to the brake booster provides a reaction surface against which the end cap bears under the force of the return spring.

\* \* \* \* \*